Feb. 8, 1949.  J. J. BROÏDO ET AL  2,461,357
CAMERA OBJECTIVE MOUNTING
Filed Dec. 4, 1945
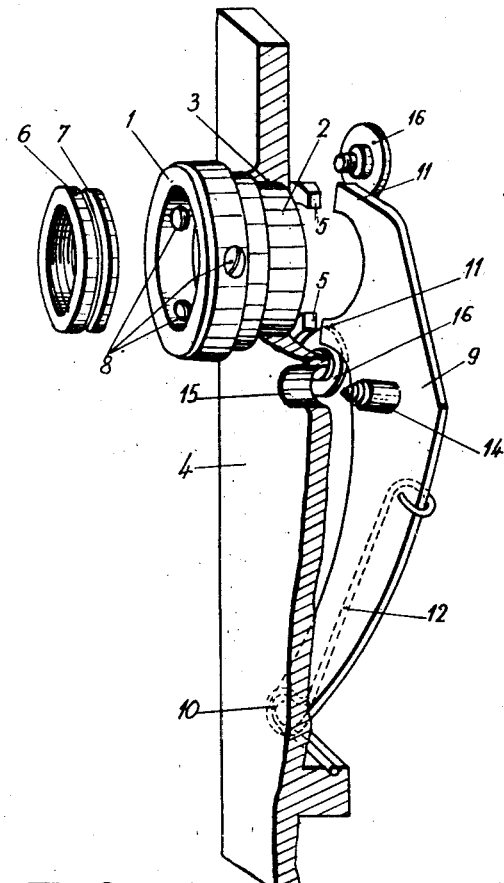
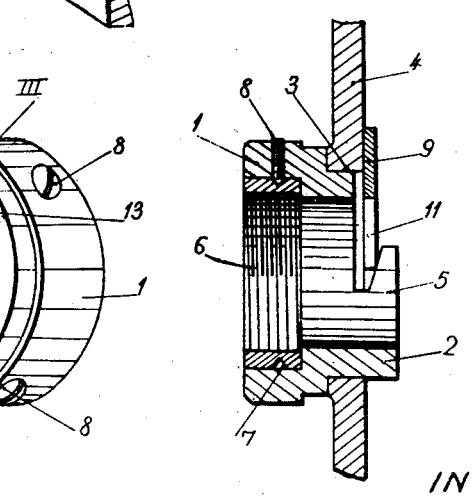
INVENTORS
JACQUES JEAN BROÏDO
JEAN WEISSBRODT
THEIR ATT'Y Patented Feb. 8, 1949

2,461,357

UNITED STATES PATENT OFFICE 2,461,357

CAMERA OBJECTIVE MOUNTING

Jacques Jean Broïdo, Joinville-le-Pont, and Jean Weissbrodt, Paris, France

Application December 4, 1945, Serial No. 632,704
In France December 6, 1944

2 Claims. (Cl. 88—57)

In photographic cameras, the objectives are generally held in a mounting which is screwed into a threaded ring belonging to the casing of the camera. This method of attachment, although securing exact location of the objective, does not permit of rapid detachability of the latter where it is desired to change the field of view by using an objective of suitable focal length.

To permit more rapid interchangeability of objectives, various systems of attachment have been devised, such as bayonet joints, slots and pins completed generally by a locking device preventing undue dismounting. There are also known attaching means comprising a double lock engaging in an annular groove formed in the mount. While the means of attachment by bayonet joints or by slots and pins permit of holding the objective stationary in a definite angular position about its optical axis due to a preliminary adjustment of the same this does not apply to the system using an annular groove, which permits a free rotation of the mount between the clamps of the two locks.

The present invention has for its object to provide an arrangement which permits of instantaneous attachment of an objective to a photographic or cinematographic camera whilst ensuring a pre-determined angular adjustment of the indications carried by said objective such as indications of diaphragm apertures.

This arrangement comprises a single lock having a semi-circular bolt located in a plane perpendicular to the optical axis of the objective and inserted in a slot cut in the rear of the mounting and forming a double cam which provides for the tightening and the suitable angular adjustment of the mounting on the camera. In this arrangement, a single element, i. e. the bolt, constitutes both the attaching member and the means for angularly adjusting the mounting on the camera.

Another feature of the invention resides in the provision of an intermediate objective receiving ring fixed in the mounting by means of pressure screws, which permit of giving once for all a precise angular position to the objective in the mounting.

Further features of the invention will be apparent in the course of the following description with reference to the annexed drawing, wherein:

Fig. 1 is a perspective view of the objective attaching means.

Fig. 2 shows the mounting of the objective in a rear perspective, and

Fig. 3 is cross-section showing the action of the lock on the mounting.

In the embodiment of the invention herein represented, which is given merely by way of example, the mounting comprises a front part 1 adapted to receive the objective and a tail or rear part 2 adapted to be inserted into an opening 3 formed in the front wall of the photographic camera. This tail 2 is cut away over a little more than half its circumference, so as to form two projections 5, with an internal inclined face forming a cam.

In the front part 1 is positioned a ring 6, threaded internally and adapted to be screwed on to the objective (not shown). On the periphery of the ring 6 is formed an annular groove 7, which, after insertion of ring 6 in part 1, engages two or three pointed pressure screws 8, screwed into said part 1 and which permit of locking the ring, and consequently the objective, in a position such that the inscriptions on the latter will be visible normally to the operator.

The attaching means further comprises a lock or bolt 9, adapted to oscillate about a pivot pin 10, screwed into the front wall 4 of the casing. This bolt may thus be displaced in a plane perpendicular to the optical axis of the objective. It comprises two jaws 11, located on opposite sides of a semi-circular opening, the diameter of which is substantially equal to the internal diameter of the rear part 2 of the mounting, so as not to intercept the light rays emanating from the objective.

A spring 12 urges bolt 9 towards the mounting, whereby the bolt is caused to engage a notch or slot cut in the rear part 2 of the mounting. For this purpose, the latter should have a suitable angular position, as the engagement of the bolt can only be effected if the two projections 5 left by said notch are located on the vertical axis passing through the pivot pin 10 of the bolt i. e. through the line III—III of Fig. 2. This orientation can be obtained, either by rotating the mounting in the opening 3 of the wall 4, until the bolt is completely engaged in the projections 5, or by providing a tenon 13 on the mounting (Fig. 2) which engages a mortise formed in the opening 3, to permit full insertion of the mounting in this opening, only in the one correct position of the mounting.

Engagement of the bolt in the projections 5 is accompanied by a tightening action, due to the shape given to the internal faces of projections 5. In Fig. 3, one of the jaws 11 of bolt 9 is shown clamping the mounting in the apparatus. A button 14 secured to the bolt and passing through an opening 15 formed in the casing wall 4, permits of manipulating the bolt from the outside against the action of spring 12, so as to release the projections 5 and mounting.

It will be seen that this arrangement permits of adjusting once for all the angular position of the objective in its mounting by means of intermediate ring 6 and of providing an instantaneous attachment of the mounting to the camera with a tightening action of the mounting at two diametrically opposite points.

Bolt 9 may be guided on the casing wall 4 either by a bridge member or by simple screws 16, having a large head or a shoulder or any other means which prevent the bolt from moving away from the wall.

It is obvious that modifications of form or of detail may be applied to the arrangement above described by way of simple example, without departure from the scope of the invention.

Thus, the bolt, instead of being an oscillating bolt, can be replaced by a sliding bolt adapted to be displaced like an ordinary bolt under the action of a spring within two slides or a bridge connected to casing wall 4.

Having now described our invention, what we claim as new and desire to secure by Letters Patent is:

1. In a camera, a casing, an objective mounting having a shoulder and a cylindrical rear barrel adapted to engage a centering hole in said casing, said cylindrical barrel being cut out at its rear end to provide two diametrically opposed cam-shaped hooks and a movable bolt pivoted to said casing and having projections adapted to engage said cam-shaped hooks for determining the angular position of said mounting and holding and tightening the same in said casing.

2. In a camera as claimed in claim 1, an objective holding ring having a groove and a recess in the front end of said mounting to hold said holding ring rotatably mounted in said mounting and a number of pressure screws screwed in said mounting and engaging said groove to hold said ring in adjusted angular position.

JACQUES JEAN BROÏDO.
JEAN WEISSBRODT.

REFERENCES CITED

The following references are of record in the file of this patent:

UNITED STATES PATENTS

| Number | Name | Date |
| --- | --- | --- |
| 1,705,385 | Wittel | Mar. 12, 1929 |
| 1,736,436 | Fuerst | Nov. 19, 1929 |
| 2,017,823 | Taylor | Oct. 15, 1935 |
| 2,083,637 | Colaisce | June 15, 1937 |
| 2,293,592 | Cisski | Aug. 18, 1942 |